United States Patent Office 3,368,849
Patented Feb. 13, 1968

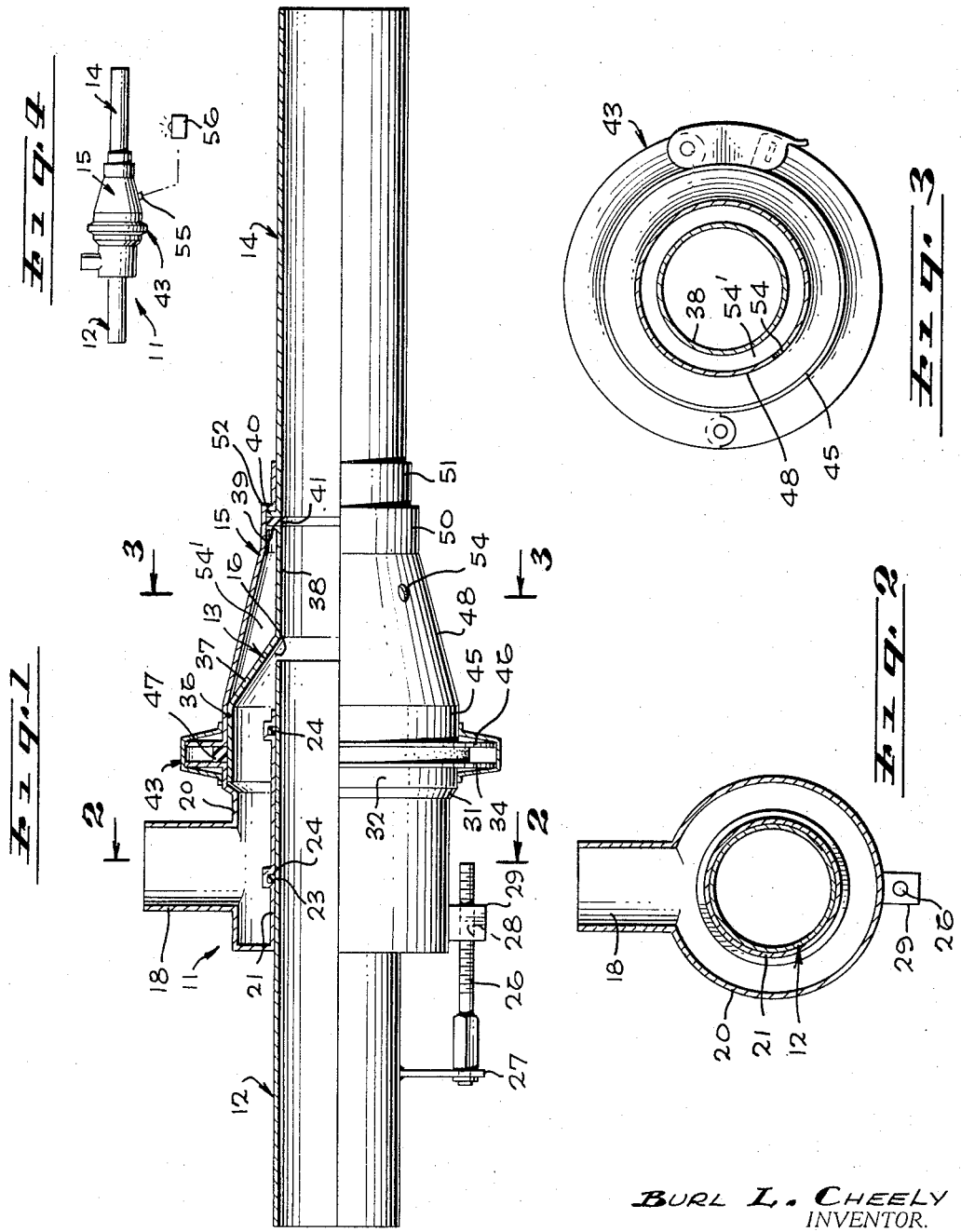

3,368,849
JET SUCTION DEVICE
Burl L. Cheely, 3534 W. Rosecrans Ave.,
Hawthorne, Calif. 90250
Filed June 17, 1966, Ser. No. 558,417
5 Claims. (Cl. 302—15)

ABSTRACT OF THE DISCLOSURE

The application discloses a jet nozzle designed to use liquid as the propellant force to move a stream of liquid and entrained solids and the construction includes telltale means to indicate failure of the orifice cone member of the device.

This invention has to do generally with jet suction devices used for moving solids in a liquid stream with a liquid as the propelling medium. Such devices are useful for moving a mixture of rocks, sand, and gravel, using water as the fluid medium, as, for example, in stripping such materials from a stream bed in placer mining operations or from other places, as in dredging.

An object of the invention is to provide an improved jet suction device made up of several easily manufacturable parts which can be readily assembled and disassembled wherein all the parts are held together by a single detachable securing means.

Another object is to provide a housing portion in a device of the type indicated having an orifice cone member through which the liquid is jetted and a surrounding housing section so constructed and arranged as to provide an indication or telltale of the failure of the orifice cone member.

It is a further object in this connection to provide the construction which enables the use of sensing means to operate a remote warning device in the case of failure of the part most subject to wear.

Still another object is to provide a novel construction embodying means whereby the jet orifice can be readily adjusted from the exterior of the device to meet the various conditions encountered.

These and other objects will be apparent from the drawing and the following description.

Referring to the drawing:

FIG. 1 is a longitudinal sectional elevational view of a device embodying the invention;

FIGS. 2 and 3 are cross-sectional views on lines 2—2 and 3—3, respectively, of FIG. 1; and FIG. 4 is a diagrammatic view illustrating the device as equipped with a warning means.

More particularly describing the invention, in general the device comprises what will be termed a main housing body 11, an intake or suction tube 12, an orifice cone 13, a discharge tube 14, and an auxiliary housing section 15. In devices of this type it will be understood that the material to be moved, which may consist of a mixture of sand, gravel and rocks and possibly debris enters tube 12 due to the suction or partial vacuum created therein by the rapid flow of fluid under pressure through an annular orifice 16 ahead of the discharge tube 14. Pressure fluid enters the housing 11 through an inlet tube 18. Conduits or hoses may be connected to either or all of the members 12, 14, and 18.

Referring now to the housing body 11, this comprises a double-walled structure comprising an outer wall 20 and a cylindrical inner wall 21 connected by an annular end wall 22. The inner wall is formed to provide one or more grooves 23 to receive seal rings 24 of any suitable type. The suction tube 12, which is cylindrical, is received within the inner wall 21 of housing body 11 and may be adjustably slid or moved longitudinally relative thereto. Depending upon the size of the unit, one or more jacks or other means may be provided to accomplish this and, in the simplified version shown, a screw or screw jack 26 is shown rotatably mounted on a bracket 27 provided on the tube and received in a threaded bore 28 of a lug 29 on the main housing body.

The forward or downstream end of the outer wall of the housing body is enlarged radially to form a tapered shoulder 31 and cylindrical step 32 which terminates in a radial flange 34.

The aforementioned orifice cone 13 has an upstream cylindrical section 36 which is received within the enlarged portion of the housing body. Intermediate its ends the member has a frusto-conical wall section 37 and this merges with a cylindrical downstream end portion 38. The latter is cylindrical and terminates in a radial flange 39.

Downstream of the orifice cone is the discharged tube 14 and this is provided with a flange 40 at its inner or upstream end to abut a seal ring 41 which is placed between it and the flange 39 at the downstream end of the orifice cone.

The parts are held together by a self-centering V-band clamp 43 of conventional construction and by the auxiliary housing section or shell 15. The latter has an upper cylindrical end portion 45 provided with a terminal flange 46 which is disposed opposite the flange on the body housing and which is separated therefrom by a seal ring 47. Member 15 has a tapered or frusto-conical intermediate section 48 and terminates in a downstream cylindrical, double stepped end portion comprising the portions 50 and 51 and the step 52. The portion 50 receives the flanges on the ends of the orifice cone and discharge tube, respectively, and the step forms an abutment to hold the parts.

It will be apparent that the orifice 16 is formed by suitably adjusting the suction tube longitudinally within the housing body. Normally the portion of the device which is most likely to fail through abrasion is the member 13 and in order to provide some telltale means for indicating this, I provide an aperture 54 in the auxiliary housing section 15. Thus, if member 13 fails, liquid will leak therefrom into the space 54′ under pressure and will flow with force through the opening 54. If desired, this may be utilized for giving an indication or warning of the condition at a distance, either by connecting a small tube to the opening so that the liquid may flow to a distant point or operate a signal means at that point, or preferably a pressure-sensitive instrument or switch 55 may be mounted in the opening, as shown in FIG. 4, and this connected by conventional means to an electrical warning device 56 which may be in the nature of a flashing light or audible warning signal. In the case of using a pressure sensing means it may be necessary to provide for bleeding pressure fluid from chamber 54′ to prevent a gradual buildup of pressure through slow leakage thereinto as might normally occur.

Although I have illustrated and described a preferred form of my invention, I contemplate that various changes and modification can be made therein without departing from the invention, the scope of which is indicated by the following claims.

I claim:

1. A jet suction device comprising an annular housing body having an inlet for pressure fluid, a suction tube received in said housing body, an orifice cone member received in said housing body in axial alignment with said suction tube and cooperating therewith to form an annular orifice at the downstream end of the suction tube, said housing body and said orifice cone member defining an annular chamber, said housing body having an opening from said chamber to the exterior whereby to provide for escape of fluid as a telltale of the failure of said orifice cone member.

2. The device set forth in claim 1 in which a pressure-sensing indicator means is connected to said annular chamber.

3. A jet suction device comprising an annular housing body formed to provide an axially extending inner wall, an axially extending outer wall spaced radially from said inner wall, and an end wall at the upstream end connecting said inner and outer walls, a suction tube upstream of said housing body and having its downstream end portion received in said inner wall of said housing body and slideable with respect thereto, an orifice cone member having a frusto-conical intermediate section and cylindrical end sections, the larger end section of said orifice cone member being received in the downstream end of said housing body, said orifice cone member cooperating with the downstream end of said suction tube to define an annular orifice and the smaller end section thereof extending downstream from the orifice in axial alignment with said suction tube, an auxiliary housing shell encompassing said orifice cone member having a cylindrical upstream end at the downstream end of said housing body, having a tapered intermediate section, and having a cylindrical downstream end of reduced diameter receiving the downstream end of said orifice cone member, and a discharge tube having its upstream end received in the downstream end of said auxiliary housing shell.

4. The device set forth in claim 3 in which the downstream end of said housing body and the upstream end of said shell are provided with opposed exterior flanges and in which said flanges are held together by detachable means, and in which the upstream end of said discharge tube has an external flange received in the downstream end of said auxiliary housing shell and in which said shell has an internal flange downstream thereof.

5. The device set forth in claim 3 in which the intermediate section of said auxiliary housing shell is provided with an opening thereby allowing escape of fluid in the event of failure of the orifice cone member.

References Cited
UNITED STATES PATENTS

| | | | |
|---|---|---|---|
| 2,668,504 | 2/1954 | Meckenstock | 302—25 |
| 2,722,372 | 11/1955 | Edwards | 302—25 |
| 3,175,515 | 3/1965 | Cheely | 103—262 |

ANDRES H. NIELSEN, *Primary Examiner.*